(12) United States Patent
Terwilliger et al.

(10) Patent No.: US 12,486,801 B2
(45) Date of Patent: Dec. 2, 2025

(54) HYDROGEN STEAM INJECTED TURBINE ENGINE WITH TURBOEXPANDER HEAT RECOVERY

(71) Applicant: RTX CORPORATION, Farmington, CT (US)

(72) Inventors: Neil J. Terwilliger, Cheshire, CT (US); Joseph B. Staubach, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/975,263

(22) Filed: Dec. 10, 2024

(65) Prior Publication Data

US 2025/0101917 A1  Mar. 27, 2025

Related U.S. Application Data

(62) Division of application No. 18/329,044, filed on Jun. 5, 2023, now Pat. No. 12,180,893.

(Continued)

(51) Int. Cl.
  *F02C 7/141* (2006.01)
  *F02C 3/22* (2006.01)
  *F02C 3/30* (2006.01)

(52) U.S. Cl.
  CPC .............. *F02C 7/141* (2013.01); *F02C 3/22* (2013.01); *F02C 3/30* (2013.01); *F05D 2260/213* (2013.01)

(58) Field of Classification Search
  CPC .. F02C 7/141; F02C 3/22; F02C 7/224; F02C 3/30; F05D 2260/213
  See application file for complete search history.

(56) References Cited

U.S. PATENT DOCUMENTS 4,062,184 A * 12/1977 Hagen ............... F02C 3/22
                                                              60/39.282
5,901,547 A *  5/1999 Smith .............. F02C 3/28
                                                              60/773

(Continued)

FOREIGN PATENT DOCUMENTS

EP  3048281 B1      4/2017
EP  4414536 A1 *   8/2024  ............... F02C 6/18
EP  4517059 A1 *   3/2025  ............... F02C 7/143

OTHER PUBLICATIONS

Extended European Search Report for European Application No. 24154540.9 mailed Jun. 7, 2024.

*Primary Examiner* — Devon C Kramer
*Assistant Examiner* — Rodolphe Andre Chabreyrie
(74) *Attorney, Agent, or Firm* — Carlson, Gaskey & Olds, P.C.

(57) ABSTRACT

A propulsion system for an aircraft includes a core engine that includes a core flow path where air is compressed in a compressor section, communicated to a combustor section, mixed with a gaseous fuel and ignited to generate an exhaust gas flow that is expanded through a turbine section. A fuel system supplies a fuel to the combustor through a fuel flow path, a first heat exchanger thermally communicates a first heat load into a cooling flow, a turboexpander where a heated cooling flow from the first heat exchanger is expanded to generate shaft power and cooled to provide a cooled cooling flow, and a second heat exchanger thermally communicates a second heat load to the cooled cooling flow that is communicated from the turboexpander, cooling flow from the second heat exchanger is communicated to the combustor section.

14 Claims, 3 Drawing Sheets

Related U.S. Application Data

(60) Provisional application No. 63/441,515, filed on Jan. 27, 2023.

(56) References Cited

U.S. PATENT DOCUMENTS

| | | | |
|---|---|---|---|
| 6,260,350 B1* | 7/2001 | Horii | F02C 7/1435 |
| | | | 60/39.53 |
| 11,041,439 B2 | 6/2021 | Roberge | |
| 11,506,124 B2 | 11/2022 | Staubach et al. | |
| 2001/0004829 A1* | 6/2001 | Liebig | F01K 23/106 |
| | | | 60/39.182 |
| 2015/0300260 A1* | 10/2015 | Wollenweber | F02C 9/40 |
| | | | 60/39.12 |
| 2016/0123226 A1 | 5/2016 | Razak et al. | |
| 2020/0088102 A1 | 3/2020 | Roberge | |
| 2021/0207500 A1 | 7/2021 | Klingels et al. | |
| 2021/0348561 A1 | 11/2021 | Cocks et al. | |
| 2022/0195928 A1 | 6/2022 | Johnson et al. | |
| 2023/0150678 A1* | 5/2023 | Klingels | B64D 33/04 |
| | | | 244/55 |
| 2023/0286661 A1 | 9/2023 | Klingels | |
| 2023/0316395 A1 | 10/2023 | Shao et al. | |
| 2023/0332522 A1* | 10/2023 | Klingels | B64D 27/18 |
| 2024/0075587 A1 | 3/2024 | Rawson et al. | |
| 2025/0052190 A1* | 2/2025 | Sibbach | F02C 3/30 |
| 2025/0075655 A1* | 3/2025 | Terwilliger | F02C 7/141 |

* cited by examiner

HYDROGEN STEAM INJECTED TURBINE ENGINE WITH TURBOEXPANDER HEAT RECOVERY

CROSS REFERENCE TO RELATED APPLICATION

This application is a Divisional of U.S. application Ser. No. 18/329,044 filed on Jun. 5, 2023, which claims priority to U.S. Provisional Application Ser. No. 63/441,515 filed on Jan. 27, 2023.

STATEMENT REGARDING FEDERALLY SPONSORED RESEARCH OR DEVELOPMENT

This invention was made with government support under Contract No.: DE-AR0001561 awarded by the United States Department of Energy, Office of ARPA-E. The Government has certain rights in this invention.

TECHNICAL FIELD

The present disclosure relates generally to a hydrogen powered aircraft propulsion system and, more particularly to a turboexpander recovering heat energy input into a cooling fuel flow.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. The lost heat reduces the overall efficiency of the engine Turbine engine manufacturers continue to seek further improvements to engine performance including improvements to reduce environmental impact while improving propulsive efficiencies.

SUMMARY

A propulsion system for an aircraft comprising according to an exemplary embodiment of this disclosure, among other possible things includes a core engine that includes a core flow path where air is compressed in a compressor section, communicated to a combustor section, mixed with a gaseous fuel and ignited to generate an exhaust gas flow that is expanded through a turbine section. A fuel system supplies a fuel to the combustor through a fuel flow path, a first heat exchanger thermally communicates a first heat load into a cooling flow, a turboexpander where a heated cooling flow from the first heat exchanger is expanded to generate shaft power and cooled to provide a cooled cooling flow, and a second heat exchanger thermally communicates a second heat load to the cooled cooling flow that is communicated from the turboexpander, cooling flow from the second heat exchanger is communicated to the combustor section.

In a further embodiment of the foregoing propulsion system, cooling flow includes a flow of cryogenic fuel.

In a further embodiment of any of the foregoing, the propulsion system includes a condenser that is configured to extract water from the exhaust gas flow and an evaporator that is configured to heat a portion of water that is extracted by the condenser to generate a steam flow for injection into the core flow path.

In a further embodiment of any of the foregoing propulsion systems, the second heat exchanger and the second heat load include the condenser.

In a further embodiment of any of the foregoing propulsion systems, a third heat exchanger is disposed downstream of the turboexpander and upstream of condenser.

In a further embodiment of any of the foregoing, the propulsion system includes a bypass valve where cooled cooling flow from the turboexpander is directed to bypass the second heat exchanger and is communicated directly to the combustor.

In a further embodiment of any of the foregoing propulsion systems, the turboexpander drives an engine accessory.

In a further embodiment of any of the foregoing propulsion systems, the turboexpander drives a primary shaft of the engine.

In a further embodiment of any of the foregoing propulsion systems, the first heat load includes at least one of waste heat from an electric system, a lubrication system heat load, an aircraft system heat load, heat from condensation, or cooling of a thermal bus that collects multiple heat loads.

In a further embodiment of any of the foregoing propulsion systems, the condenser is in communication with a bypass airflow path for cooling the exhaust gas flow during aircraft operation.

In a further embodiment of any of the foregoing, the propulsion system includes a water storage tank and the condenser communicates water to the water storage tank and a first pump is configured to move water from the storage tank to the evaporator.

In a further embodiment of any of the foregoing propulsion systems, the turbine section includes at least a low pressure turbine, a high pressure turbine and an intermediate pressure turbine and the compressor section includes a high pressure compressor that is coupled to the high pressure turbine through a high shaft and a low pressure compressor that is coupled to the intermediate pressure turbine through an intermediate shaft.

In a further embodiment of any of the foregoing, the propulsion system includes a gearbox that is coupled to a low shaft for driving a fan at a speed lower than the low-pressure turbine.

A propulsion system for an aircraft according to another exemplary embodiment of this disclosure, among other possible things includes a core engine that includes a core flow path where air is compressed in a compressor section, communicated to a combustor section, mixed with a fuel and ignited to generate an exhaust gas flow that is expanded through a turbine section, a fuel system for storing and pressurizing fuel as a liquid, boiling the fuel, and supplying a gaseous fuel to the combustor through a fuel flow path, a first heat exchanger that thermally communicates a first heat load into a flow of the gaseous fuel, a turboexpander where heated fuel flow from the first heat exchanger is expanded to generate shaft power and cooled to provide a cooled gaseous fuel flow, and a second heat exchanger that provides a second source of heat into the cooled gaseous fuel, the reheated fuel flow is communicated to the combustor.

In a further embodiment of the foregoing propulsion system, the second heat exchanger is a condenser.

In a further embodiment of any of the foregoing propulsion systems, the condenser is in thermal communication with a bypass airflow passage for cooling the exhaust gas flow in the condenser during aircraft operation.

In a further embodiment of any of the foregoing, the propulsion system includes a bypass valve where fuel flow from the turboexpander is directed to bypass the condenser cooling flow path and is communicated directly to the combustor.

In a further embodiment of any of the foregoing propulsion systems, the first heat load includes at least one of an electrical heat load, a lubrication system heat load or an aircraft system heat load.

A method of recovering thermal energy from a cryogenic fuel flow of an aircraft propulsion system, the method according to another exemplary embodiment of this disclosure, among other possible things includes configuring a core engine to generate an exhaust gas flow from a cryogenic fuel, configuring a condenser to extract water from the exhaust gas flow with a cooling cryogenic fuel flow, configuring an evaporator generate a steam flow by heating extracted water from the condenser with a portion of the exhaust gas flow, configuring a first heat exchanger to thermal communicate a first heat load into a flow of the cryogenic fuel, configuring a turboexpander to expand and cool a heated cryogenic fuel flow that is communicated from the first heat exchanger to generate shaft power and generate a cooled fuel flow, and configuring a condenser cooling flow path from the turboexpander to the condenser to thermally communicate the cooled fuel flow with the exhaust gas flow for cooling the exhaust gas flow to liquify water in the exhaust gas flow, and providing a fuel flow path for a fuel flow from the condenser to a combustor.

In a further embodiment of the above, the method further includes directing the cooled fuel flow from the turboexpander is directed to bypass the condenser cooling flow path and is communicated directly to the combustor.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
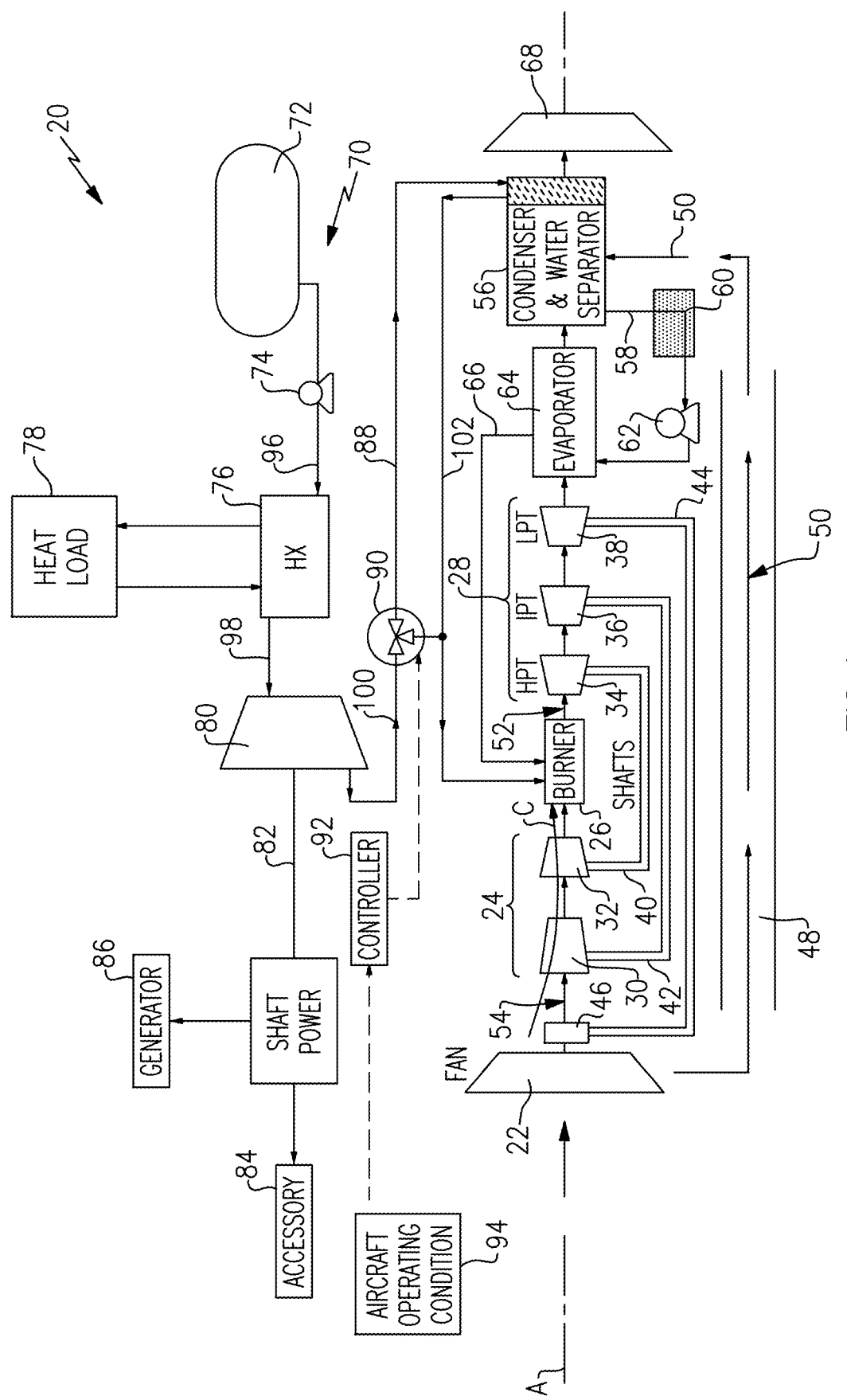
FIG. 1 is a schematic view of an example propulsion system embodiment.

FIG. 1 schematically illustrates an example hydrogen steam injected inter-cooled turbine engine that is generally indicated at 20. The engine includes a turboexpander 80 where a heated cooling flow from the first heat exchanger is expanded to generate shaft power and cooled to recover thermal energy input into the cooling flow.

The engine 20 includes core engine with a core airflow path C through a fan 22, a compressor section 24, a combustor 26 and a turbine section 28. The fan 22 drives inlet air as a core flow 54 into the compressor section 24. In the compressor section 24, the core flow 54 is compressed and communicated to a combustor 26. In the combustor 26, the core flow 54 is mixed with a fuel flow 96 and ignited to generate a high energy gas flow 52 that expands through the turbine section 28 where energy is extracted and utilized to drive the fan 22 and the compressor section 24. A bypass flow 48 may flow through the fan 22 and bypass the remaining components of the engine 20. The high energy gas flow 52 is exhausted from the turbine section 28 and communicated through an evaporator 64 and a condenser assembly 56 before being exhausted through a nozzle 68.

The example compressor section 24 includes a low pressure compressor (LPC) 30 and a high pressure compressor (HPC) 32. The turbine section 28 includes a high pressure turbine (HPT) 34, an intermediate pressure turbine (IPT) 36, and a low pressure turbine (LPT) 38. The turbines 34, 36 and 38 are coupled to a corresponding compressor section. In this disclosed example, the HPT 34 is coupled by a high shaft 40 to drive the HPT 32. An intermediate shaft 42 couples the IPT 36 to the LPC 30.

A low shaft 44 is coupled between the LPT 38 and a gearbox 46 to drive the fan 22. The example gearbox 46 is an epicyclical gear train, such as a planetary gear system, star gear system or other known gear system, with a gear reduction ratio of greater than about 2.3.

The engine 20 is configured to burn hydrogen provided by a fuel system 70. The fuel system 70 includes a liquid hydrogen ($LH_2$) tank 72 in communication with at least one pump 74. The pump 74 drives a fuel flow 96 to the combustor through a fuel system and eventually to the combustor 26. $LH_2$ provides a cooling flow utilized as a thermal heat sink to cool engine and/or aircraft heat loads. In one disclosed embodiment, the fuel flow 96 is placed in thermal communication with a heat load 78 through a heat exchanger 76. The heat loads 78 may include, any engine and/or aircraft system, such as for example and without limitation, super conducting electrics, a working fluid of an environmental control system of the aircraft, an air conditioning heat exchanger, and engine working fluid heat exchangers. Heat accepted into the hydrogen fuel flow increase the overall fuel temperature prior to injection into the combustor 26.

A turboexpander 80 is provided to recovery thermal energy input into the fuel flow 96. The turboexpander 80 receives a heated fuel flow 98 from the heat exchanger 76. The heated fuel flow 98 is expanded and cooled through the turboexpander 80. Expansion through the turboexpander 80 generates shaft power to drive the shaft 82. The shaft 82 is utilized to drive an engine accessory component 84 and/or a generator 86. It should be appreciated that the shaft 82 driven by the turboexpander 80 may be utilized to drive other engine and aircraft components within the scope and contemplation of this disclosure.

The cooled fuel flow 100 exhausted from the turboexpander 80 is routed to the condenser assembly 56 through a cooled fuel path 88. The cooled fuel flow 100 from the turboexpander 80 has additional capacity to absorb heat and is utilized in the condenser assembly 56 to cool the exhaust gas flow 52 and condense water into a liquid phase. The cooled fuel flow 100 is heated in the process and communicated from the condenser assembly 56 to the combustor 26 as a reheated fuel flow 102.

A valve 90 is provided such that all or a portion of the cooled fuel flow 100 may bypass the condenser assembly 56. In this example embodiment, a portion of the bypass airflow 50 is communicated to the condenser assembly 56 to provide a heat sink to cool the exhaust gas flow and transform water into the liquid phase. During aircraft operation, the bypass airflow 50 may be entirely sufficient to provide the cooling needed to liquify water from the exhaust gas flow 52. In such operating conditions, the additional thermal heat sink capacity provided by the cooled fuel flow 100 may not be needed and is therefore bypassed directly to the combustor 26 by the valve 90. A controller 92 is provided that is programmed to operate the control valve 90 depending on aircraft an engine operating conditions as schematically indicated at 94.

However, other aircraft operating conditions, such as during taxi and takeoff, the bypass flow 50 may not be sufficient to liquify water from the exhaust gas flow in desired amounts. In such operating conditions, the controller 92 may actuate the valve 90 to direct all or a portion of the cooled fuel flow 100 to the condenser assembly 56 to provide additional heat absorption capacity. Moreover, the example controller 92 may be programmed to operate the valve 90 to direct the cooled fuel flow 100 to accept additional heat based on combustor operation. In some operating conditions, the reheated fuel flow 102 may be desired to improve combustion efficiency. Accordingly, the controller 92 may be programmed to control the valve 90 to tailor a flow of cooled fuel flow 100 from the turboexpander 80 to improve both condenser assembly and combustor operation and efficiency.

An evaporator 64 is exposed to heat from the exhaust gas flow 52 to generate a steam flow 66 from a water flow 58 from the condenser assembly 56. Water recovered by the condenser assembly 56 is communicated to a water tank 60, pressurized by a pump 62 and communicated to the evaporator 64. In the evaporator 64, the recovered water is transformed into the steam flow 66 and communicated into the core flow path C. The generated steam improves performance by increasing turbine mass flow and power output without additional work required by the compressor section 24. In one example embodiment, the steam flow is injected into the combustor 26. The steam flow 66 may also be injected at a location upstream of the combustor 26.

The engine 20 has an increased power output from the injected steam 66 due to an increasing mass flow through the turbine section 32 without a corresponding increase in work from the compressor section 24. An example engine operation cycle may include up to (or more than) 35% steam-air-ratios (SAR) and may be assisted by a multiple fold (e.g., 2×, 3×, etc.) increase in moisture from burning $H_2$ as the fuel.

Figure 2:
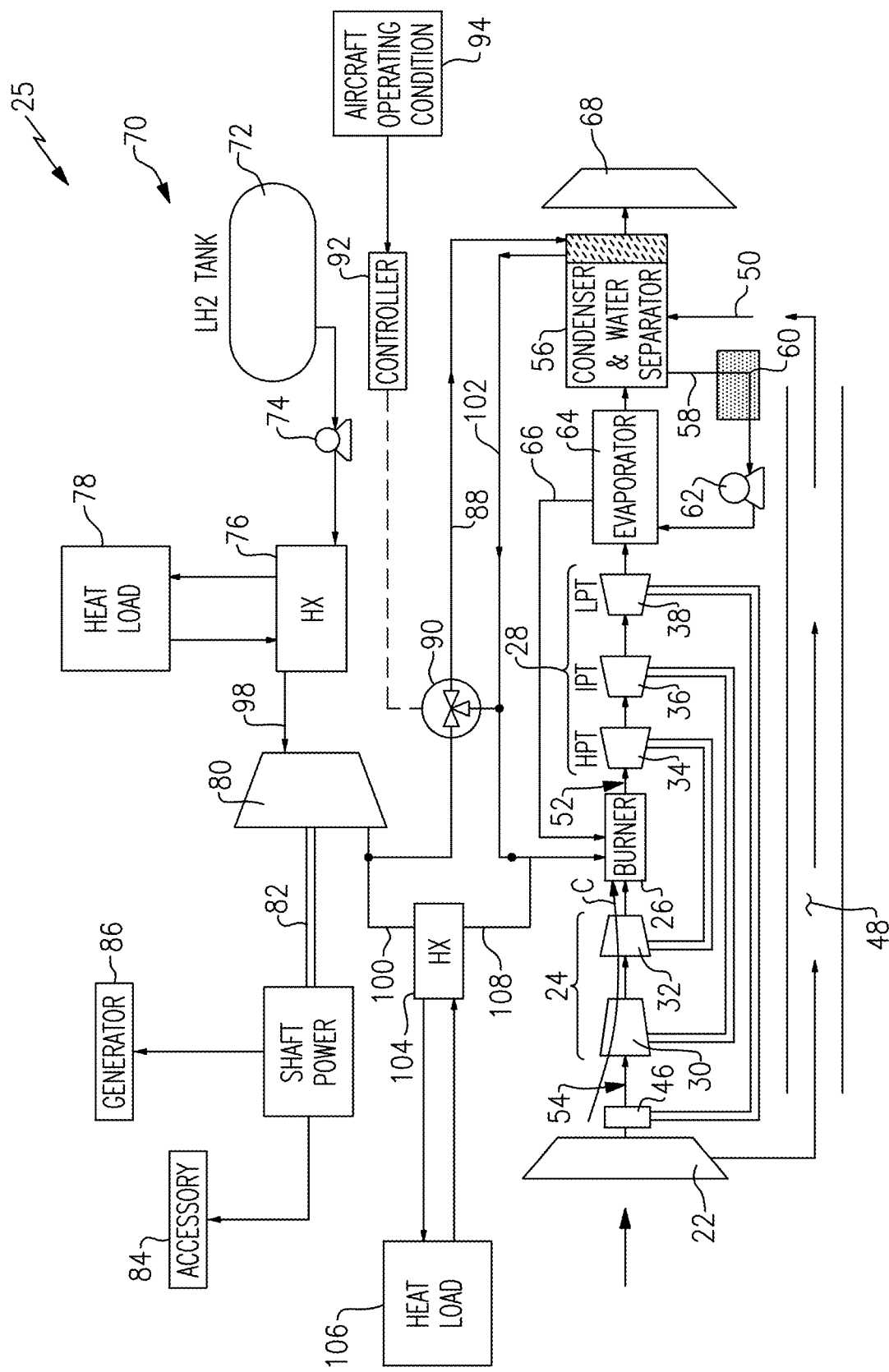
FIG. 2 is a schematic view of another example propulsion system embodiment.

Referring to FIG. 2, another example engine embodiment is schematically indicated at 25 and includes an additional heat exchanger 104 for accepting heat from another heat load 106. In this disclosed example, the cooled fuel flow 100 from the turboexpander 80 is communicated to both the condenser assembly 56 and to the heat exchanger 104. The heat exchanger 104 provides for cooling the heat load 106. The heat load 106 may be any heat generating engine or aircraft system. In one disclosed, example, the additional heat load 106 may include a lubrication system, an electric machine, power electronics or a cooling system. As appreciated, other engine or aircraft systems may be cooled by the cooled fuel flow 100 exhausted from the turboexpander 80. Moreover, although one heat exchanger 104 is shown by way of example, several heat exchangers could be utilized and are within the contemplation and scope of this disclosure.

Reheated flow 108 from the heat exchanger 104 is communicated to the combustor 26. The reheated flow 108 may be combined with the reheated flow 102 from the condenser assembly 56.

Figure 3:
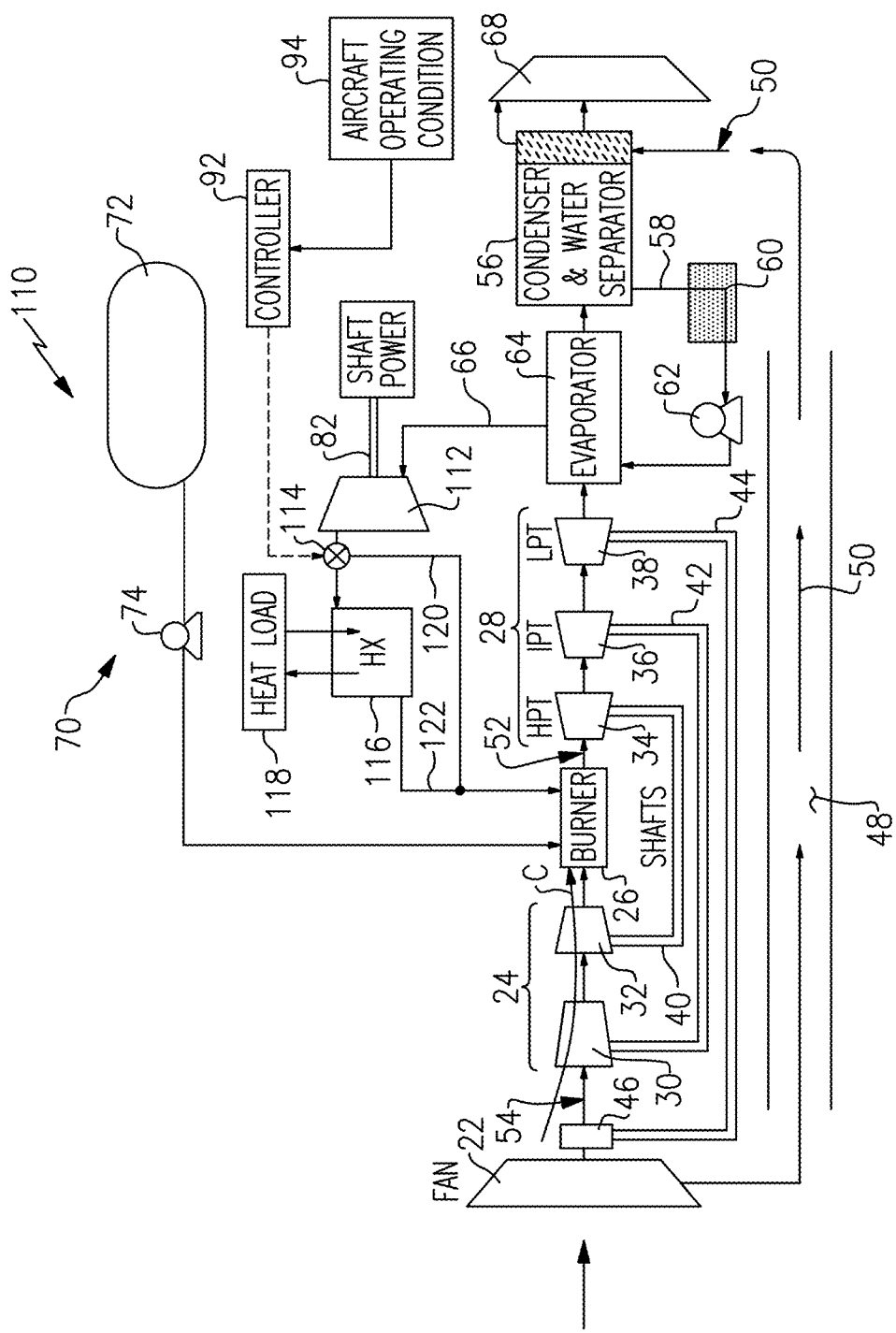
FIG. 3 is a schematic view of yet another example propulsion system embodiment.

Referring to FIG. 3, another example engine embodiment is shown and schematically indicated at 110. The engine 110 uses a steam flow 66 from the evaporator 64 to drive turboexpander 112. The steam flow 66 expands and cools through the turboexpander 112 to drive a shaft 82 and generate shaft power. The shaft power may be utilized to drive engine and aircraft components as disclosed. The cooled steam flow 120 may than be communicated directly to the combustor 26 or routed to a heat exchanger 116 to accept additional heat from a heat load 118.

In this disclosed example, heat from the heat load 118 is transferred into the cooled steam flow 120 in a heat exchanger 116 to generate a heat steam flow 122 that is communicated into the combustor 26. A valve 114 is provided and controlled by a controller 92 to bypass all or a proportion of the cooled steam flow 120 around the heat exchanger 116 and directly into the combustor 26 and the heat exchanger 116. The bypass of the cooled steam flow 120 may be provided based on current aircraft operating conditions 94 communicated to the controller 92. The further use of the cooled steam flow 120 provides for the additional reclamation of thermal energy in the form of shaft power provided by the turboexpander 112.

Although the example engine 20 is described and shown by way of example as other engine configurations would benefit from this disclosure and are within the contemplation and scope of this disclosure. Moreover, it will be appreciated that other engine configurations may include additional structures and features and are within the contemplation and scope of this disclosure.

Accordingly, the disclosed assemblies provide for recovery of thermal energy input into a cooling flow used as a heat sink to improve engine efficiency.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
   a core engine including a core flow path where air is compressed in a compressor section, communicated to a combustor section, mixed with a gaseous fuel and ignited to generate an exhaust gas flow that is expanded through a turbine section;
   a fuel system for supplying a flow of the gaseous fuel to the combustor section through a fuel flow path;
   a condenser configured to receive a cooling flow and extract water from the exhaust gas flow;
   an evaporator configured to heat a portion of the water extracted by the condenser to generate a steam flow;
   a turboexpander where the steam flow is expanded to generate shaft power and cooled to generate a cooled steam flow; and
   a heat exchanger where the cooled steam flow is heated by a heat load outside the exhaust gas flow to generate a heated steam flow for communication to the combustor section.

2. The propulsion system as recited in claim 1, including a bypass valve where the cooled steam flow from the turboexpander is directed to bypass the heat exchanger and is communicated directly to the combustor section.

3. The propulsion system as recited in claim 1, wherein the turboexpander drives an engine accessory.

4. The propulsion system as recited in claim 1, wherein the turboexpander drives a primary shaft of the core engine.

5. The propulsion system as recited in claim 1, wherein the heat load comprises at least one of waste heat from an electric system, a lubrication system heat load, an aircraft system heat load, heat from condensation, or cooling of a thermal bus that collects multiple heat loads.

6. The propulsion system as recited in claim 1, wherein the condenser is in communication with a bypass airflow path for cooling the exhaust gas flow during aircraft operation.

7. The propulsion system as recited in claim 1, including a water storage tank and the condenser communicates the extracted water to the water storage tank and a first pump is configured to move water from the water storage tank to the evaporator.

8. The propulsion system as recited in claim 1, wherein the turbine section includes at least a low pressure turbine, a high pressure turbine and an intermediate pressure turbine and the compressor section includes a high pressure compressor coupled to the high pressure turbine through a high shaft and a low pressure compressor coupled to the intermediate pressure turbine through an intermediate shaft.

9. The propulsion system as recited in claim 8, including a gearbox coupled to a low shaft for driving a fan at a speed lower than the low pressure turbine.

10. A propulsion system for an aircraft comprising:
a core engine including a core flow path where air is compressed in a compressor section, communicated to a combustor section, mixed with a fuel and ignited to generate an exhaust gas flow that is expanded through a turbine section;
a fuel system for storing and pressurizing the fuel as a liquid, boiling the fuel, and supplying a gaseous fuel to the combustor section through a fuel flow path;
a condenser configured to receive a cooling flow and extract water from the exhaust gas flow, wherein the condenser is in thermal communication with a bypass airflow from a bypass airflow passage for cooling the exhaust gas flow in the condenser during aircraft operation for extracting water;
an evaporator where the water extracted from the exhaust gas flow is heated to generate a steam flow;
a turboexpander where the steam flow from the evaporator is expanded to generate shaft power and exhaust a cooled steam flow; and
a heat exchanger were at least a portion of the cooled steam flow from the turboexpander is heated by a heat load outside the exhaust gas flow.

11. The propulsion system as recited in claim 10, including a bypass valve where all or a portion of the portion of the cooled steam flow from the turboexpander is bypassed around the heat exchanger and directed toward the combustor section.

12. The propulsion system as recited in claim 11, wherein the heat load comprises at least one of an electrical heat load, a lubrication system heat load or an aircraft system heat load.

13. A method of recovering thermal energy from a cryogenic fuel flow of an aircraft propulsion system, the method comprising:
configuring a core engine to generate an exhaust gas flow from a cryogenic fuel;
configuring a condenser to extract water from the exhaust gas flow by cooling the exhaust gas flow with a cooling flow;
configuring an evaporator to generate a steam flow by heating extracted water from the condenser with a portion of the exhaust gas flow;
configuring a turboexpander to expand and cool the steam flow communicated from the evaporator to generate shaft power and generate a cooled steam flow;
configuring a flow path from the turboexpander to the core engine that includes a heat exchanger for communicating a heat load outside the exhaust gas flow into at least a portion of the cooled steam flow to generate a reheated steam flow; and
configuring the core engine to receive at least a portion of the reheated steam flow from the heat exchanger.

14. The method as recited in claim 13, further comprising configuring a valve for controlling a bypassed cooled steam flow of the cooled steam flow through a bypass passage around the heat exchanger and directing the bypassed cooled steam flow into the core engine.

* * * * *